(12) United States Patent
Xia

(10) Patent No.: US 6,928,047 B1
(45) Date of Patent: Aug. 9, 2005

(54) PRECODED OFDM SYSTEMS ROBUST TO SPECTRAL NULL CHANNELS AND VECTOR OFDM SYSTEMS WITH REDUCED CYCLIC PREFIX LENGTH

(75) Inventor: Xiang-Gen Xia, Newark, DE (US)

(73) Assignee: The University of Delaware, Newark, DE (US)

( * ) Notice: Subject to any disclaimer, the term of this patent is extended or adjusted under 35 U.S.C. 154(b) by 802 days.

(21) Appl. No.: 09/658,184

(22) Filed: Sep. 8, 2000

Related U.S. Application Data
(60) Provisional application No. 60/153,489, filed on Sep. 11, 1999.

(51) Int. Cl.[7] ................................................ H04J 11/00
(52) U.S. Cl. ........................ 370/206; 370/208; 375/222
(58) Field of Search ................................. 370/206, 208, 370/308, 505, 260, 210, 528, 504; 375/296, 222, 260, 226

(56) References Cited

U.S. PATENT DOCUMENTS

| | | | |
|---|---|---|---|
| 6,175,550 B1 * | 1/2001 | van Nee | 370/206 |
| 6,493,399 B1 * | 12/2002 | Xia et al. | 375/296 |
| 6,628,735 B1 * | 9/2003 | Belotserkovsky et al. | 375/355 |
| 6,657,950 B1 * | 12/2003 | Jones et al. | 370/208 |

OTHER PUBLICATIONS

Xiang–Gen Xia, *New Procoding for Intersymbol Interference Cancellation Using Nonmaximally Decimated Multirate Filterbanks with Ideal FIR Equalizers*, IEEE Transactions On Signal Processing, vol. 45, No. 10, pp. 2431–2441 (Oct. 1997).

A.N. Akansu, et al., *Orthogonal Transmultiplexers in Communication: A Review*, IEEE Transactions On Signal Processing, vol. 46, No. 4, pp. 979–995 (Apr. 1998).

Y. (Geoffrey) Li and Nelson R. Sollenberger, *Adaptive Antenna Arrays for OFDM Systems With Cochannel Interference*, IEEE Transactions On Communications, vol. 47, No. 2, pp. 217–229 (Feb. 1999).

Y. (Geoffrey) Li, et al., *Channel Estimation for OFDM Systems with Transmitter Diversity in Mobile Wireless Channels*, IEEE Journal on Selected Areas In Communications, vol. 17, No. 3, pp. 461–471(Mar. 1999).

L. Cimini, Jr., *Analysis and Simulation of a Digital Mobile Channel Using Orthogonal Frequency Division Multiplexing*, IEEE Transactions On Communications, vol. 33, No. 7, pp. 665–675 (Jul. 1985).

J. Bingham, *Multicarrier Modulation for Data Transmission: An Idea Whose Time Has Come*, IEEE Communications Magazine, pp. 5–14 (May 1990).

(Continued)

*Primary Examiner*—Chau Nguyen
*Assistant Examiner*—Robert W. Wilson
(74) *Attorney, Agent, or Firm*—Connolly Bove Lodge & Hutz LLP

(57) ABSTRACT

A precoded orthogonal frequency division multiplexer (OFDM) system that improves the preformance of OFDM systems for spectral null channels, and size K×1 vector OFDM systems that reduce the cyclic prefix length by K times compared to conventional OFDM systems. The precoding scheme comprises inserting one or more zeros between each of the two sets of K consecutive information symbols, although it can be generalized to a general form. This precoding scheme removes the spectral nulls of an ISI channel without knowing the ISI channel. When no zero is inserts between each of the two sets of K consecutive information symbols and only K consecutive symbols are blocked together, vector OFDM systems are obtained. The bit error rate performance of the vector OFDM systems of the present invention is much improved over conventional OFDM systems.

6 Claims, 4 Drawing Sheets

Precoded OFDM system.

OTHER PUBLICATIONS

J. Chow et al., *A Discrete Mutitone Transceiver System for HDSL Applications*, IEEE Journal On Selected Areas In Communications, vol. 9, No. 6, pp. 895–908 (Aug. 1991).

W. Zou and Y. Wu, *COFDM: An Overview*, IEEE Transactions On Broadcasting, vol. 41, No. 1, pp. 1–8 (Mar. 1995).

B. Le Floch et al., *Coded Orthogonal Frequency Divison Multiplex*, Proceedings Of The IEEE, vol. 83, No. 6, pp. 982–996 (Jun. 1995).

T. Zogakis et al., *A Coded and Shaped Discrete Multitone System*, IEEE Transactions On Communications, vol. 43, No. 12, pp. 2941–2949 (Dec. 1995).

Y. Li et al., *Transmitter Diversity for OFDM Systems and Its Impact on High–Rate Data Wireless Networks*, IEEE Journal On Selected Areas In Communications, vol. 17, No. 7, pp. 1233–1243 (Jul. 1999).

* cited by examiner

Conventional OFDM system.

Precoded OFDM system.

Equivalent SISO and MIMO systems.
SISO
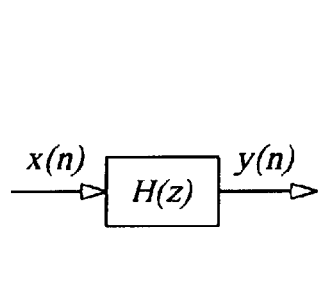
MIMO
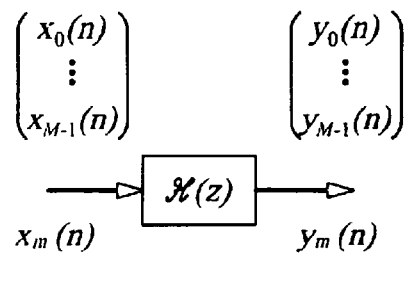
blocking
FIG. 3(a)                FIG. 3(b)
An equivalent precoded OFDM system.
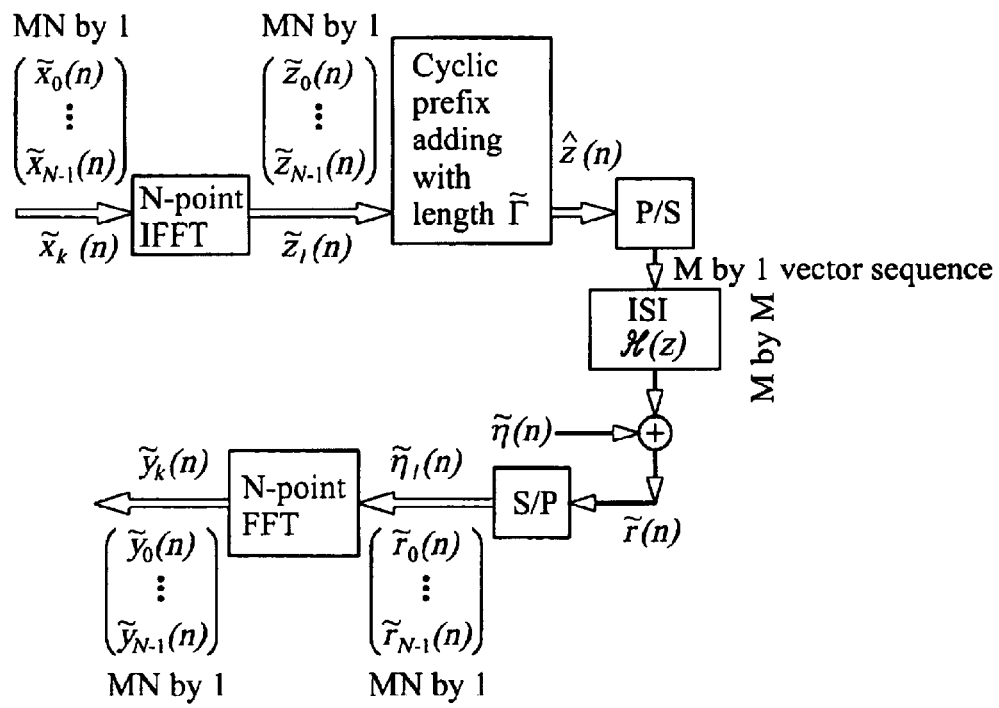
FIG. 4

Fourier spectrum for three ISI channels.

Performance comparison for OFDM systems: Channel A.

Performance comparison for OFDM systems: Channel B.

Performance comparison for OFDM systems: Channel C.

PRECODED OFDM SYSTEMS ROBUST TO SPECTRAL NULL CHANNELS AND VECTOR OFDM SYSTEMS WITH REDUCED CYCLIC PREFIX LENGTH

This application claims benefit of Ser. No. 60/153,489 filed Sep. 11, 1999.

BACKGROUND OF THE INVENTION

A. Field of the Invention

The present invention relates generally to orthogonal frequency division multiplexing (OFDM) systems used in digital wireless Communications systems and, more particularly to precoded OFDM systems robust to spectral null channels and vector OFDM systems with reduced cyclic prefix length.

B. Description of the Related Art

Orthogonal frequency division multiplexing (OFDM) systems have been widely used in high speed digital wireless communication systems, such as VHDSL and ADSL since OFDM systems convert intersymbol interference (ISI) channels into ISI-free channels by inserting a cyclic prefix as an overhead of the data rate at the transmitter. In high speed digital wireless applications, however, the ISI channel may have spectral nulls, which may degrade the performance of the existing OFDM systems because the Fourier transform of the ISI channel needs to be inverted for each subcarrier at the OFDM system receiver. For this reason, coded OFDM systems were proposed comprising conventional trellis coded modulation (TCM) or turbo codes. Another problem with conventional OFDM systems is that, when the ISI channel has many taps, the data rate overhead of the cyclic prefix insertion is high.

In a conventional OFDM system, as shown in FIG. 1, $x(n)$ stands for the information symbol sequences after the binary to complex mapping, such as BPSK and QPSK symbol sequences, N is the number of carriers in the OFDM system, i.e., the size of the IFFT (inverted fast Fourier transform) and FFT (fast Fourier transform) in the OFDM system shown in FIG. 1 is N. The ISI channel has the following transfer function:

$$H(z) = \sum_{n=0}^{L} h(n) z^{-n} \quad (2.1)$$

where $h(n)$ are the impulse responses of the ISI channel. Letting $\Gamma$ be the cyclic prefix length in the OFDM system shown in FIG. 1 arid $\Gamma > L$ for the purpose of removing the ISI; $\eta(n)$ be the additive white Gaussian noise (AWGN) with mean zero and variance $\sigma^2 = N_0/2$, where $N_0$ is the single sided power spectral density of the noise $\eta(n)$; and $r(n)$ be the received signal at the receiver and $y(n)$ be the signal after the FFT of the received signal $r(n)$; then the relationship between the information symbols $x(n)$ and the signal $y(n)$ can be formulated as:

$$y_k(n) = H_k x_k(n) + \xi_k(n), \, k=0, 1, \ldots, N-1, \quad (2.2)$$

where $q_k(n)$ denotes the kth subsequence of $q(n)$, i.e., $(q(n))_n = (q_0(n), q_1(n), \ldots, q_{N-1}(n))_n$, and q stands for x, y, and $\xi$, $\xi(n)$ is the FFT of the noise $\eta(n)$ and therefore has the same statistics as $\eta(n)$, and $$H_k = H(z)|_{z=\exp(j2\pi k/N)}, \, k=0, 1, \ldots, N-1. \quad (2.3)$$

The receiver needs to detect the information sequence $x_k(n)$ from $y_k(n)$ through Equation 2.2.

From Equation 2.2, the ISI channel $H(z)$ is converted to N ISI-free subchannels $H_k$. The key for this property to hold is the inserting of the cyclic prefix with length $\Gamma$ that is greater than or equal to the number of ISI taps L.

For the ISI-free system in Equation 2.2, the performance analysis of the detection is as follows: letting $P_{ber,x}(E_b/N_0)$ be the bit error rate (BER) for the signal constellation $x(n)$ in the AWGN channel at the SNR $E_b/N_0$, where $E_b$ is the energy per bit, then, the BER vs. $E_b/N_0$ of the OFDM shown in FIG. 1 is:

$$P_e = \frac{1}{N} \sum_{k=0}^{N-1} P_{ber,x}\left( \frac{|H_k|^2 N E_b}{(N+\Gamma) N_0} \right) \quad (2.4)$$

For example, when the BPSK for $x(n)$ is used, we have $$P_{ber,x}(E_b/N_0) = Q\left( \sqrt{\frac{2 E_b}{N_0}} \right). \quad (2.5)$$

Therefore, the BER vs. $E_b/N_0$ for the conventional OFDM system is $$P_e = \frac{1}{N} \sum_{k=0}^{N-1} Q\left( \sqrt{\frac{2 |H_k|^2 N E_b}{(N+\Gamma) N_0}} \right). \quad (2.6)$$

SUMMARY OF THE INVENTION

An object of the invention is to provide OFDM systems which are improved over conventional OFDM systems by making the systems robust to spectral null channels and by reducing the cyclic prefix length.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a precoded OFDM system which inserts one or more zeros between each of the two sets of K consecutive information symbols, which may be independent of the ISI channel, wherein the insertion of zeros causes the data rate to be expanded in the precoded OFDM system, removing spectral nulls of an ISI channel without knowing the channel information, without increasing the encoding/decoding complexity.

To further achieve the objects, the present invention comprises a vector OFDM system used to reduce the data rate overhead of the prefix insertion wherein each K consecutive information symbols are blocked together as a K×1 vector sequence, reducing the data rate overhead of the original cyclic prefix insertion by K times and improving the bit error rate (BER) performance of the vector OFDM system over those of the conventional OFDM system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 3 is a block diagram of equivalent SISO and MIMO systems of the preferred embodiment of the present invention;

FIG. 4 is a block diagram of an equivalent precoded OFDM system of the preferred embodiment of the present invention;

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

The present invention is drawn generally to a precoded OFDM system which inserts one or more zeros between each of the two sets of K consecutive information symbols, which may be independent of the ISI channel. The preceding may also comprise a general modulated coding, where the preceding depends on the ISI channel in an optimal way. The insertion of zeros causes the data rate to be expanded in the precoded OFDM systems. Thus, for spectral null channels the precoded OFDM systems perform better than conventional OFDM systems even when the convolutional codes and TCM are used in the conventional OFDM systems, i.e., COFDM systems. The proposed precoding scheme of the present invention removes the spectral nulls of an ISI channel without knowing the channel information. Furthermore, the precoded OFDM system does not increase the encoding/decoding complexity as much as conventional COFDM does, where Viterbi decoding for the conventional COFDM is needed.

Another aspect of the present invention includes vector OFDM systems used to reduce the data rate overhead of the prefix insertion. In the vector OFDM systems no zeros are inserted between each of the two sets of K consecutive information symbols, but each K consecutive information symbols are blocked together as a K×1 vector sequence. Compared to the precoded OFDM systems, the data rate before the prefix adding of the vector OFDM systems is not changed. When K×1 vector sequence is processed, the ISI channel can be blocked into a K×K matrix ISI channel, but the length of the matrix ISI channel is only about 1/K of the original ISI channel length. The cyclic prefix length for the vector OFDM systems only needs to be greater than or equal to the matrix ISI channel length. This implies that the data rate overhead the original cyclic prefix insertion is reduced by K times for the vector OFDM systems. The bit error rate (BER) performances of the vector OFDM systems are better than those of the conventional OFDM systems.

In the conventional OFDM systems, the scalar ISI channel is converted to N scalar ISI-free subchannels. In the precoded or vector OFDM systems of the present invention, scalar sequences are vectorized and a scalar ISI channel is converted to a matrix ISI channel. Furthermore, the OFDM systems of the present invention convert the matrix ISI channel into N matrix ISI-free subchannels with N constant matrices. These N constant matrices can be squared or not. The precoded OFDM systems correspond to the nonsquared case, while the vector OFDM systems correspond to the squared case.

A. General Precoded OFDM Systems

Figure 2:
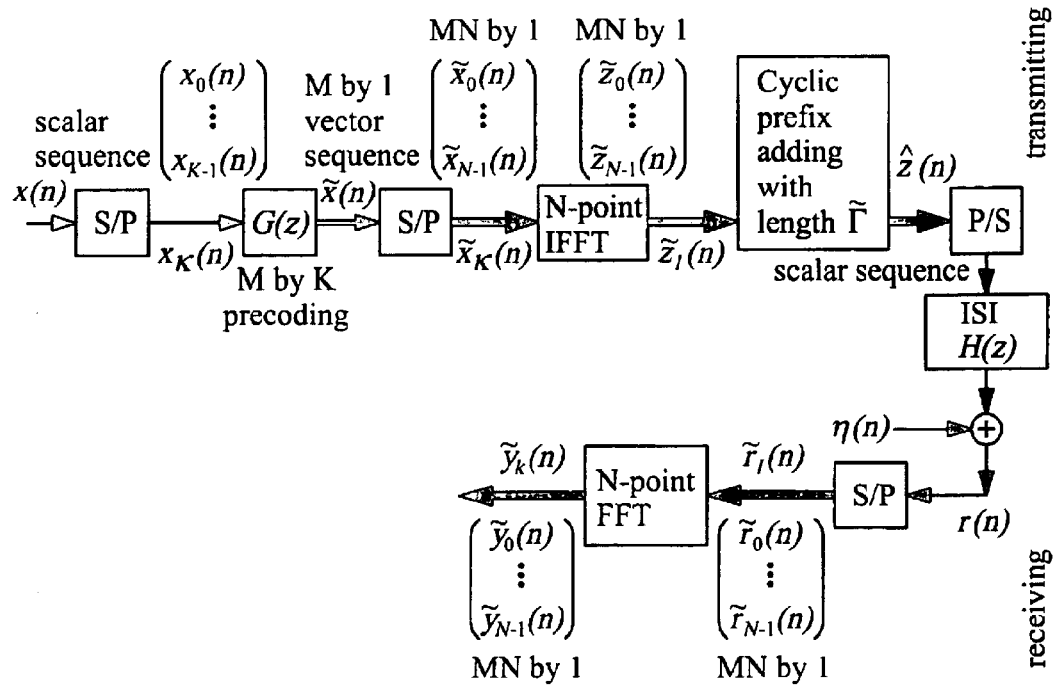
FIG. 2 is a block diagram of a precoded OFDM system made in accordance with a preferred embodiment of the present invention.

A block diagram of a precoded OFDM system of the present invention is shown in FIG. 2. Symbol x(n) is as before, the information sequence after the binary to complex mapping. The information sequence x(n) is blocked into a K×1 vector sequence:

$$x(n)=(x_0(n), x_1(n), \ldots, x_{K-1}(n))^T,$$

where T denotes the transpose and $x_k(n)=x(Kn+k)$, $k=0, 1, \ldots, K-1$. Symbol G(z) is a precoder and an M×K polynomial matrix, i.e., $G(z)=(g^{ij}(z))_{M \times K}$, where $g_{ij}(z)$, in general, is a polynomial of $z^{-1}$.

The precoded M×1 vector sequence is denoted by x(n). Letting K×1 polynomial vector X(z) and M×1 polynomial vector X̃(z) denote the z transforms of vector sequences x(n) and x(n), respectively, then:

$$\tilde{X}(z)=G(z)\bar{X}(z). \qquad (3.1)$$

The precoded M×1 vector sequence x(n) is blocked again into MN×1 vector sequence:

$$\tilde{x}(n)=(\tilde{x}_0^T(n), \tilde{x}_1^T(n), \ldots, \tilde{x}_{N-1}^T(n))^T$$

where each $x_k(n)=x(Nn+k)$ is already an M×1 vector for $k=0, 1, \ldots, N-1$. Letting $z_l(n)$, $l=0, 1, \ldots, N-1$, be the output of the N-point IFFT of $x_k(n)$, $k=0, 1, \ldots, N-1$, i.e., $$\tilde{z}_l(n) = \frac{1}{\sqrt{N}} \sum_{k=0}^{N-1} \tilde{x}_k(n) \exp(j2\pi kl/N), l = 0, 1, \ldots, N-1, \qquad (3.2)$$

which is the N-point IFFT of the individual components of the N vectors $x_k$n.

The cyclic prefix in FIG. 2 is to add the first Γ vectors $z_l(n)$, $l=0, 1, \ldots, \Gamma-1$ to the end of the vector sequence $z_l(n)$, $l=0, 1, \ldots, N-1$. In other words, the vector sequence after the cyclic prefix is:

$$\tilde{z}(n)=(\tilde{z}_0^T(n), \tilde{z}_1^T(n), \ldots, \tilde{z}_{N-1}^T(n),\tilde{z}_0^T(n), \ldots, \tilde{z}_{\Gamma-1}^T(n))^T, \qquad (3.3)$$

which has size M(N+Γ)×1. The cyclic prefix length Γ will be determined later for the purpose of removing the ISI of the precoded OFDM system. Each subvector $z_l(n)$ in z(n) in Equation (3.3) has a size of M×1, and the prefix components are vectors rather than scalars as in conventional OFDM systems.

The transmitted scalar sequence in the precoded OFDM system of FIG. 2, z(n), is obtained by the parallel to serial conversion of the vector sequence z(n) in Equation (3.3). The precoded OFDM system in FIG. 2 is different from the OFDM systems with antenna diversities since there is only one transmitting antenna and one receiving antenna.

Converting the received scalar sequence at the receiver r(n) to the following MN×1 vector sequence:

$$\tilde{r}(n)=(\tilde{r}_0^T(n), \tilde{r}_1^T(n), \ldots, \tilde{r}_{0N-1}^T(n))^T,$$

where each $r_l(n)$ has size M×1, the output of the N-point FFT of r(n) is:

$$\tilde{y}_k(n) = \frac{1}{\sqrt{N}} \sum_{l=0}^{N-1} \tilde{r}_l(n)\exp(-j2\pi kl/N), k = 0, 1, \ldots, N-1, \quad (3.4)$$

where the formulation is similar to the N-point IFFT in Equation (3.2) and each $y_k(n)$ is an M×1 vector.

A single input and single output (SISO) linear time invariant (LTI) system with transfer function H(z) is equivalent to an M input and M output system by the blocking process with block length M, i.e., the serial to parallel process. The equivalence here means that the M inputs and M outputs are the blocked versions (or serial to parallel conversions) of the single input and single output and vice versa. The equivalent systems are shown in FIG. 3, where the equivalent multi-input multi-output (MIMO) transfer function matrix $\mathcal{H}(z)$ is the blocked version of H(z) and is given by the following pseudo-circulant polynomial matrix:

$$H(z) = \begin{bmatrix} h_0(z) & z^{-1}h_{M-1}(z) & \ldots & z^{-1}h_1(z) \\ h_1(z) & h_0(z) & \ldots & z^{-1}h_2(z) \\ \vdots & \vdots & \vdots & \vdots \\ h_{M-2}(z) & h_{M-3}(z) & \ldots & z^{-1}h_{M-1}(z) \\ h_{M-1}(z) & h_{M-2}(z) & \ldots & h_0(z) \end{bmatrix} \quad (3.5)$$

where $h_k(z)$ is the kth polyphase component of H(z), i.e., $$h_k(z) = \sum_l h(Ml+k)z^{-l}, k = 0, 1, \ldots, M-1.$$

If the order of H(z) is L as in Equation (2.1), then the order L of the blocked version $\mathcal{H}(z)$ in Equation (3.5) of H(z) with block size M is:

$$\tilde{L} = \left[\frac{L}{M}\right], \quad (3.6)$$

where [a] stands for the smallest integer b such that b≧a. Clearly, $$\tilde{L} < \frac{L}{M} + 1. \quad (3.7)$$

Figure 1:
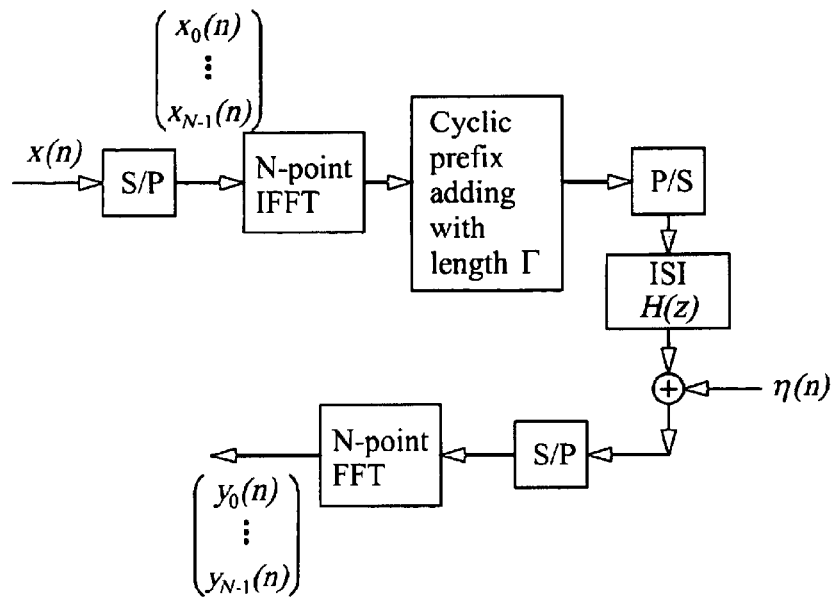
FIG. 1 is a block diagram of a conventional OFDM system.

Using the above equivalence of the SISO and MIMO systems, the precoded OFDM system in FIG. 2 is equivalent to the one shown in FIG. 4. The equivalent precoded OFDM system in FIG. 4 is similar to the conventional OFDM system in FIG. 1 except that the scalar sequences x(n) and y(n) are replaced by M×1 vector sequences x(n) and y(n), respectively. Therefore, similar to (2.2) it is not hard to derive the relationship between $x_k(n)$ and $y_k(n)$:

$$\tilde{y}_k(n) = H_k\tilde{x}_k(n) + \epsilon_k(n), k=0, 1, \ldots, N-1, \quad (3.8)$$

under the condition that the cyclic prefix length Γ is greater than or equal to the order of the MIMO transfer function matrix $\mathcal{H}(z)$ in Equation (3.5), i.e., $$\Gamma \geq \tilde{L}. \quad (3.9)$$

The constant matrices $\mathcal{H}_k$ in (3.8) are similar to the constants Hk in (2.2) and have the following forms $$\mathcal{H}_k = \mathcal{H}(z)|_{z=\exp(j2\pi k/N)}, k=0, 1, 1, \ldots, N-1. \quad (3.10)$$

The additive noise ξ(n) in Equation (3.8) is the blocked version of ξ(n) and its components have the same power spectral density as η(n), and all components of all the vectors $\xi_k(n)$ are i.i.d. complex Gaussian random variables.

B. Precoded OFDM Systems

This section discusses a special precoding scheme that is independent of the ISI channel H(z).

1. A Special Precoder

Since the vector sequence $x_k(n)$ in Equation (3.8) is the precoded sequence of the original information sequence xk(n) shown in FIG. 2, there are two methods for detecting the original information sequence $x_k(n)$. One method is to detect $x_k(n)$ first from the ISI-free vector system in Equation (3.8) and then decode the precoder G(z) for $x_k(n)$. The problem with this method is that, when the ISI channel H(z) is spectral null, the blocked matrix channel $\mathcal{H}(z)$ is also spectral null by the following diagonalization of $\mathcal{H}(z^M)$:

$$\mathcal{H}(z^M) = (W^*_M\Lambda(z))^{-1}\text{diag}(H(z), H(zW_M), \ldots, H(zW_M), \ldots, H(zW_M^{M-1}))W^*_M\Lambda(z), \quad (4.1)$$

where $W_M = \exp(-j2\pi/M)$ and $W_M$ is the DFT matrix of size M i.e., $W_M = (W^{mn}_M)_{0 \leq m,n \leq M-1}$, and $\Lambda(z) = \text{diag}(1, z^{-1}, \ldots, z^{+1})$. As will be seen, the performance of the detection of $x_k(n)$ in Equation (3.8) for spectral null ISI channels is too poor that the coding gain of the precoder G(z) is far away to make it up. This implies that the separate ISI removing and precoder decoding may not perform well for spectral null channels, which is similar to the existing COFDM systems.

The other method is the joint ISI removing and precoder decoding, i.e., the combination of the precoder G(z) with the vector systems of Equation (3.8). If the precoder G(z) is not a constant matrix, the encoded vector sequence $x_k(n)$ is the convolution of the information vector sequence $x_k(n)$ and the precoder impulse response g(n). The convolution and the constant matrix $\mathcal{H}_k$ multiplications in Equation (3.8) induces ISI, which may complicate the decoding of the system Equation (3.8).

The above problems suggest that the use of a constant M×K matrix precoder G(z)=G. In this case, Equation (3.8) becomes:

$$y_k(n) = \mathcal{H}_k G x_k(n) + \xi_k(n), k=0, 1, \ldots, N-1, \quad (4.2)$$

where, for k=0, 1, . . . , N-1:

$$x_k(n) = x(Nn+k) = (x_0(Nn+k), x_1(Nn+k), \ldots, x_{k-1}(Nn+k))^T = (x(K(Nn+k)+0), x(K(Nn+k)+1), \ldots, x(K(Nn+k)+K-1))^T \quad (4.3)$$

are the original K×1 information vector sequences and need to be detected from $y_k(n)$. It is clear Lt that one wants to have the singular values of all matrices $\{\mathcal{H}_K G\}_{k=0, 1, \ldots, N-1}$ as large as possible for the optimal output SNR. However, since the transmitter usually does not have the channel information $\mathcal{H}_k$, it may not be easy to optimally design the constant precoder G in Equation (4.2) at the transmitter.

Using the following simplest precoder G:

$$G(z) = G = \begin{bmatrix} I_{K \times K} \\ 0_{(M-K) \times K} \end{bmatrix}, \quad (4.4)$$

where M>K, $I_{K \times K}$ stands for the K×K identity matrix and $0_{(M-K) \times K}$ stands for (M-K)×K all zero matrix, the precoder of Equation (4.4) comprises inserting M-K zeros between each two sets of K consecutive information samples. This precoder was first used for converting a spectral null channel into a non-spectral-null matrix channel as long as the M equally spaced rotations of the zero set of H(z) do not intersect each other. The precoder of Equation (4.4) is independent of the ISI channel and does not change the signal energy, i.e., the energy of the signal x(n) before the preceding is equal to the energy of the signal x(n) after the preceding.

When the precoder of Equation (4.4) is used, the input-output ISI-free system of Equation (4.2) can be rewritten as follows. For each k, let '$\mathcal{H}_k$ denote the first K column submatrix of $\mathcal{H}_k$, i.e., if $$\mathcal{H}_k=(h_{mn})_{0 \leq m \leq N-1, \ 0 \leq n \leq N-1}, \text{ then } \mathcal{H}_k=(h_{mn})_{0 \leq m \leq N1, \ 0 \leq n \leq K-1} \quad (4.5)$$

Therefore, $$y_k(n)=\mathcal{H}_k x_k(n)+\xi_k(n), \ k=0, 1, \ldots, N-1, \quad (4.6)$$

where $x_k(n)$ is as (4.3).

Without the data rate expansion, i.e., M=K in Equation (4.4), the above system of Equation (4.6) may not be invertible if the ISI channel H(z) has spectral nulls, i.e., $\mathcal{H}_k$ may not be invertible (may have zero singular values). With the data rate expansion, i.e., M>K, under a minor condition on the channel, the non-squared matrices $\mathcal{H}_k$ are invertible (have all nonzero singular values). The detection performance of the information symbols $X_k(n)$ in Equation (4.6) depends on how large the singular values of the M×K matrices $\mathcal{H}_k$ are, i.e., how high the output SNR is. From the above, the precoding is able to convert systems $\mathcal{H}_k$ with possibly zero singular values into systems $\mathcal{H}_k$ with all nonzero singular values. Thus, the precoding may improve the performance of the OFDM system. The following example analytically shows how the precoding improves the performance.

2. EXAMPLE

Letting the ISI channel be:

$$H(z) = \frac{1}{\sqrt{2}}(1 + z^{-1}),$$

and considering 4 carriers, i.e., N=4, and ½ rate precoder of Elation (4.4), i.e., K=1 and M=2, the precoding inserts one zero in each two information symbols. According to Equation (3.5), the blocked ISI channel with block size 2 is:

$$H(z) = \frac{1}{\sqrt{2}}\begin{bmatrix} 1 & z^{-1} \\ 1 & 1 \end{bmatrix}. \quad (4.7)$$

In the conventional OFDM system, the input-output relationship (2.2) is:

$$y_k(n) = \frac{1}{\sqrt{2}}(1 + \exp(-j2\pi k/4))x_k(n) + \varepsilon_k(n), \ k = 0, 1, 2, 3, \quad (4.8)$$

where $$H_k = \frac{1 + \exp(-j2\pi k/4)}{\sqrt{2}} \text{ or}$$

$$H_0 = \sqrt{2}, \ H_1 = \frac{1-j}{\sqrt{2}}, \ H_2 = 0, \text{ and}$$

$$H_3 = \frac{1+j}{\sqrt{2}}.$$

One can see that the third subcarrier channel in Equation (4.8) completely fails. The BER performance of the conventional OFDM system is thus:

$$P_e = \frac{1}{4}\frac{1}{2} = \frac{1}{8} \quad (4.9)$$

For the precoded OFDM system, the input-output relationship of Equation (4.6) is:

$$\tilde{y}(n) = \frac{1}{\sqrt{2}}\begin{bmatrix} 1 \\ 1 \end{bmatrix}x_k(n) + \tilde{\varepsilon}_k(n), \ k = 0, 1, 2, 3, \text{ where} \quad (4.10)$$

$$\overline{H}_k = \frac{1}{\sqrt{2}}\begin{bmatrix} 1 \\ 1 \end{bmatrix}, \ k = 0, 1, 2, 3,$$

which have the same singular value 1. Equation (4.10) may be rewritten as:

$$\frac{1}{\sqrt{2}}[1 \ 1]\tilde{y}_k(n) = x_k(n) + \tilde{\varepsilon}'(n), \quad (4.11)$$

where $\xi'_k(n)$ are complex Gaussian random variables with the same statistics as $\xi_k(n)$. In this case, the BER performance of the precoded OFDM is the same as the uncoded AWGN performance if the additional cyclic prefix is ignored. For example, when BPSK is used, the BER is:

$$P_e = Q\left(\sqrt{\frac{2E_b}{N_0}}\right). \quad (4.12)$$

Since the precoder of Equation (4.4) does not increase the signal energy, the bit energy $E_b$ before the prefix insertion does not increase although the data rate is increased. In Equation (4.12), the cyclic prefix data expansion is ignored otherwise the $E_b/N_0$ in Equation (4.12) needs to be replaced by:

$$\frac{NE_b}{(N+\tilde{\Gamma})N_0} = \frac{4E_b}{5N_0}.$$

The BER performance of Equation (4.12) of the precoded OFDM system is much better than the uncoded OFDM system of Equation (4.9). In conventional COFDM systems, the conventional TCM or other error correction codes are used, and the coding gain is limited for a fixed computational load. For example, the coding gain is about 3 dB at the BER of $10^{-5}$, 6 dB at the BER of $10^{-7}$ and 7 dB at the BER of $10^{-9}$ for conventional COFDM systems, which can not bring the BER of Equation (4.9) down to the BER for Equation (4.12). To increase the data rate for the precoded OFDM system of the present invention, high rate modulation schemes, such as 64QAM or 256QAM, can be used before the precoded OFDM system. Existing COFDM systems do not erase the spectral nulls of the ISI channel while the precoded OFDM systems of the present invention do, as shown in the above example, where the spectral null characteristics plays the key role in the performance degradation of an OFDM system.

Considering the precoder (4.4) without data rate increase, i.e., M=K, the input-output relationship of Equation (4.2) for the precoded OFDM system, which will be called vector OFDM later, becomes:

$$\tilde{y}_k(n) = \frac{1}{\sqrt{2}} \begin{bmatrix} 1 & e^{-j2\pi k/4} \\ 1 & 1 \end{bmatrix} \tilde{x}_k(n) + \tilde{\varepsilon}_k(n), k = 0, 1, 2, 3, \text{ where} \quad (4.13)$$

$$H_k = \frac{1}{\sqrt{2}} \begin{bmatrix} 1 & e^{-j2\pi k/4} \\ 1 & 1 \end{bmatrix}, k = 0, 1, 2, 3,$$

and the singular values of $\mathcal{H}_0$ are $\sqrt{2}$ and 0, i.e., the zero singular value can not be removed if no data rate expansion is used in the preceding. In this case, there are equivalently 8 subchannels and one of them fails due to the 0 singular value. Thus, the BER performance is:

$$P_e \approx \frac{1}{8}\frac{1}{2} = \frac{1}{16}. \quad (4.14)$$

Even when a subchannel fails, the BER performance of Equation (4.14) of the vector OFDM system is better than the BER performance of the conventional OFDM system of Equation (4.9).

3. Performance Analysis of the Precoded OFDM Systems

To study the BER performance of the precoded OFDM systems, requires estimating $x_k(n)$ from $y_k(n)$ through Equation (4.6) for each fixed index k. There are different methods for the estimation, such as the maximum-likelihood (ML) estimation and the minimum mean square error (MMSE) estimation. For the BER performance analysis the MMSE estimation is used. For the simulations presented in Section D, the ML estimation for each fixed index k is used. The BER for the MMSE estimation is an upper bound of the BER for the ML estimation when the vector size of $x_k(n)$ is greater than 1, i.e., K>1.

The MMSE estimator of $x_k(n)$ in Equation (4.6) is given by:

$$\hat{x}_k(n) = (\overline{H}_k)\dagger \tilde{y}_k(n), k=0, 1, \ldots, N-1, \quad (4.15)$$

where † stands for the pseudo inverse, i.e., $$(\overline{H}_k)\dagger = ((\overline{H}^*_k)^T \overline{H}_k)^{-1} (\overline{H}^*_k)^T. \quad (4.16)$$

The noise of the MMSE estimator $x_k(n)$ is $$\epsilon_k(n) = (\overline{H}_k)\dagger \tilde{\epsilon}_k(n), \quad (4.17)$$

whose components are, in general, complex Gaussian random variables. Then, the theoretical BER can be calculated as long as the original binary to complex mapping, number of carriers, N, the ISI $\text{Re}(\epsilon_k(n))$. channel H(z) and the preceding rate K/M are given.

Considering the BPSK signal constellation, the complex Gaussian random noise are reduced to the real Gaussian random noise by cutting the imaginary part that does not affect the performance. Thus the noise in this case is:

$$\text{Re}(\epsilon_k(n)).$$

Therefore, the BER vs. $E_b/N_0$ for the MMSE estimator given in (4.15) is:

$$P_e = \frac{2^{K-1}}{2^K - 1} \frac{1}{N} \sum_{k=0}^{N-1} \left(1 - \frac{1}{(2\pi)^{K/2}(\det M_k)^{1/2}} \int_{-\gamma b}^{\infty} \cdots \int_{-\gamma b}^{\infty} \exp\left\{-\frac{1}{2}\bar{x}^T M_k^{-1} \bar{x}\right\} dx_1 \ldots dx_K\right), \quad (4.18)$$

where the factor $2^{K-1}/(2^K-1)$ is due to the conversion of the symbol error rate (SER) of x to the BER, $x=(x_1, \ldots, x_K)$,.

$$\gamma b = \sqrt{\frac{2E_b N}{N_0 (N + \Gamma)}}, \quad (4.19)$$

and $$M_k = \text{Re}((\mathcal{H}_k)\dagger)\text{Re}((\mathcal{H}_k)\dagger)^T + \text{Im}((\mathcal{H}_k)\dagger)^T \text{Im}((\mathcal{H}_k)\dagger))^T \quad (4.20)$$

The overall data rate overhead can be easily calculated as:

$$\frac{M(N+\Gamma)}{KN} \approx \frac{M\left(N + \frac{L}{M}\right)}{KN} = \frac{MN + L}{KN}, \quad (4.21)$$

where L+1 is the length of the ISI channel H(z), and ≈ is due to the fact that $\Gamma=[L/M]=L/M$ if L is a multiple of M and 1+L/M otherwise. The uncoded OFDM systems discussed above corresponds to the case when K=M=1, in which the data rate overhead for the uncoded OFDM systems is:

$$\frac{N+L}{N}. \quad (4.22)$$

C. Vector OFDM Systems

When the ISI channel length L+1 in Equation (2.1) is large, the cyclic prefix length Γ=L in the conventional OFDM systems is large too. Consequently, the data rate overhead (N+L)/N is high when L is large. In this section vector OFDM systems of the present invention that reduce the data rate overhead while the ISI channels are still converted to ISI-free channels, are discussed.

The vector OFDM systems comprise the precoded systems shown in FIG. 2 with a special precoder $G(z)=I_{K \times K}$ that blocks the input data into K×1 vectors so that the data rate is not changed, i.e., no redundancy is added. In other words, the precoder of Equation (4.4) in the precoded OFDM systems takes the squared identity matrix, i.e., M=K in Equation (4.4). Similar to Equation (4.21), the vector cyclic prefix data rate overhead is:

$$\frac{K(N+\Gamma)}{KN} \approx \frac{N + \frac{L}{K}}{N}. \quad (5.1)$$

Compared to the data rate overhead (N+L)/N for the conventional OFDM systems, the data rate overhead in the vector OFDM systems is reduced by K times, where K is the vector size.

Figure 6:
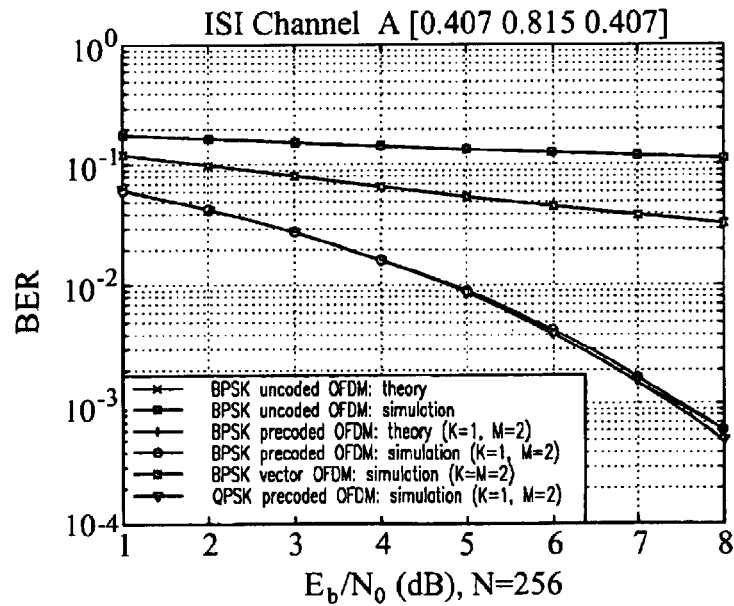
FIGS. 6–8 are graphs showing respective performance comparisons for OFDM systems.
Figure 7:
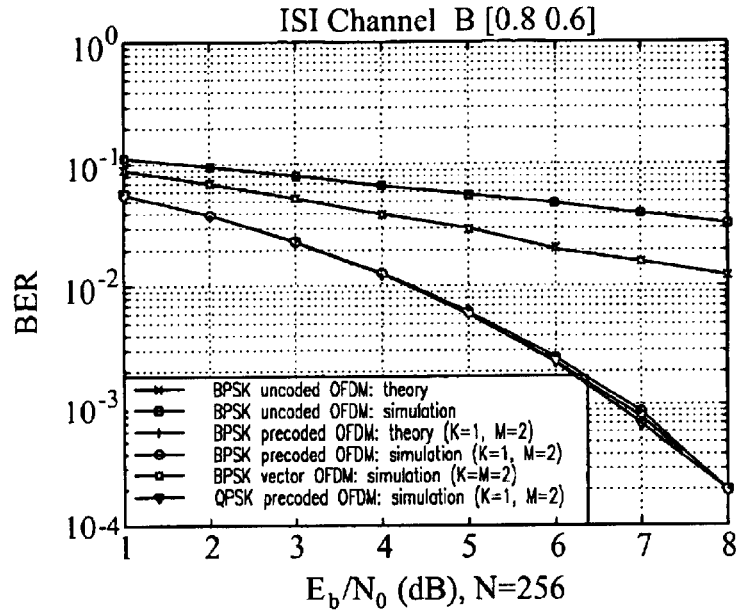
Figure 8:
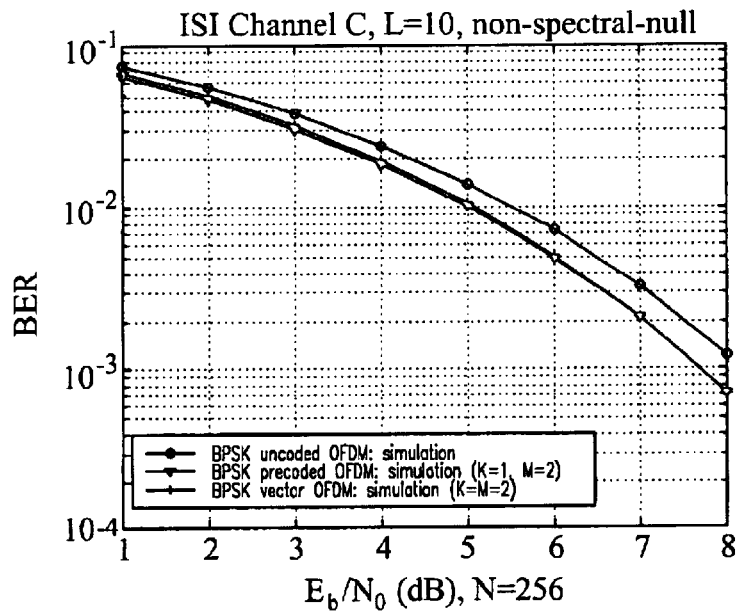

The receiver is the same as the one for the precoded OFDM systems in Sections B.1 and B.3 with K=M. In this case, the ISI-free systems (4.6) at the receiver becomes:

$$\tilde{y}_k(n) = H_k \tilde{x}_k(n) + \epsilon_k(n), k=0, 1, \ldots, N-1, \quad (5.2)$$

where $\mathcal{H}_k$ are defined in Equations (3.10) and (3.5). As mentioned in the preceding sections, the robustness of the vector OFDM systems to spectral nulls of ISI channels is similar to the those of the conventional uncoded OFDM systems, since no redundancy is inserted in vector OFDM systems. In other words, the BER performance of the vector OFDM systems is similar to the one for the uncoded OFDM systems. From simulations, the performance of the vector OFDM systems is even better than the one of the uncoded OFDM systems, see FIGS. 6–8, which is similar to the improvement from Equations (4.9) to (4.14) in the simple example presented in Section B.2. The performance analysis in Section B.3 for the precoded OFDM systems applies to the vector OFDM systems by replacing M=K.

D. Numerical Results

In this section, numerical results are presented for some theoretical and simulation curves of the BER vs. $E_b/N_0$. The number of carriers is chosen as 256, i.e., N=256, in all the following numerical examples. Three ISI channels are considered:

Channel A: h=[0.407, 0.813, 0.407], which is a spectral-null channel;

Channel B: h=[0.8, 0.6], which, although, does not have spectral-nulls, its Fourier transform values at some frequencies are small and the small values causes the performance of the conventional uncoded OFDM system; and Channel C: h=[0.001+0.0001j, 0.0485+0.0194j, 0.0573+ 0.0253j, 0.0786±0.0282j, 0.0874+0.0447j, 0.9222+0.3031j, 0.1427+0.0349j, 0.0835+0.0157j, 0.0621+0.0078j, 0.0359+ 0.0049j, 0.0214+0.0019j], which does not have spectral null or small Fourier transform values.

Figure 5:
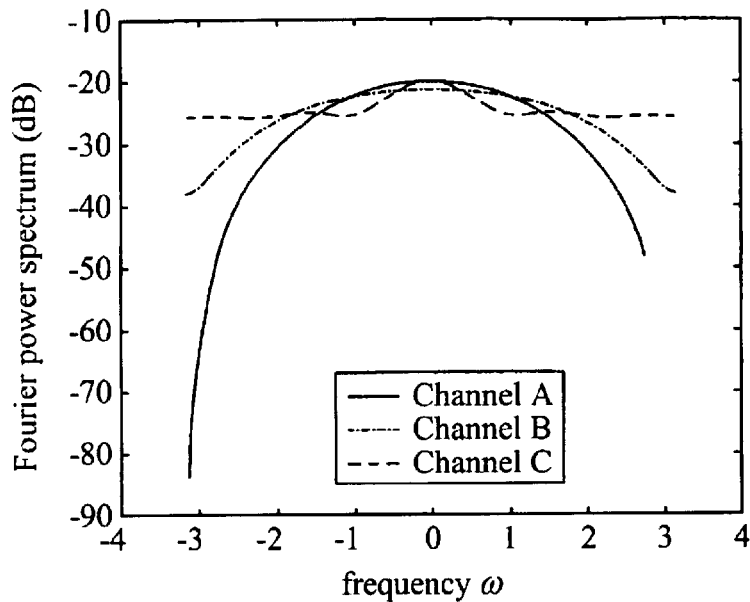
FIG. 5 is a graph showing a Fourier spectrum for three ISI channels.

Their Fourier power spectrum (dB) are plotted in FIG. 5. Channel A and Channel C are selected from the examples presented in G. L. Stuber, *Principles of Mobile Communications*, Kluwer Academic Publishers, Boston 1996.

For Channel A and Channel B, six curves of the BER vs. $E_b/N_0$ are plotted. The theoretical and simulated curves for the uncoded OFDM system with BPSK signaling are marked by x and □, respectively. The theoretical and simulated curves for the precoded OFDM system with rate ½, i.e., K=1 and M=2, and the BPSK signaling are marked by + and o, respectively. The simulated curve for the precoded OFDM system with rate ½, i.e., K=1 and M=2, and the QPSK signaling is marked by ▽. One can clearly see the improvement of the preceding. The BER performances of the uncoded and precoded OFDM systems are incomparable, where the difference can not be reached by any existing COFDM systems. The QPSK precoded OFDM system has the same data rate as the uncoded BPSK OFDM system while their performances are much different. The performance improvement can not be achieved by any existing COFDM systems using the TCM or even turbo codes.

From FIG. 5, the non-spectral-null property of Channel B is better than the one of Channel A. One can see that the BER performances of all the OFDM systems in FIG. 7 for Channel B are better than the ones in FIG. 6 for Channel A.

The curve for the vector OFDM with vector size K=2. i.e., K=M=2 in the precoded OFDM system is marked by *. One can see that the performance for the vector OFDM system is even better than the one for the uncoded OFDM system for these two channels. The data rate overhead for Channel A is saved by half for the vector OFDM system compared to the conventional OFDM system.

For Channel C, three simulation curves of the BER vs. $E_{b/N0}$ are plotted, where the signal constellations are all BPSK. The uncoded conventional OFDM system is marked by o. The precoded OFDM system of rate ½ with K=1 and A1=2 is marked by ▽. The vector OFDM system with vector size 2, i.e., K=M=2, is marked by +. Since the ISI channel is not spectral null, the precoding does not show too much performance advantage. The vector OFDM system however, still performs better than the conventional OFDM system while the cyclic prefix data rate overhead for the vector OFDM is (256+5)/256 and the one for the conventional OFDM is (256+10)/256, where the prefix length is reduced by half.

Thus, the precoded OFDM systems of the present invention outperforms the uncoded OFDM systems for spectral null channels in a way that any existing COFDM system can not achieve. Unlike the existing COFDM systems, the precoded OFDM systems of the present invention erases the spectral nulls of an ISI channel. The data rate loss because of the precoding can be remedied by using higher signal constellations by changing the BPSK to the QPSK.

The vector OFDM systems of the present invention are able to reduce the cyclic prefix data rate overhead for the conventional OFDM systems by K times, where K is the vector size. Numerical analysis showed that the performance of the vector OFDM systems of the present invention is better than the one of the conventional OFDM systems.

For spectral null channels, a way to erase the spectral nulls by coding is to prevent information symbols from being sent at the null frequencies. This coding method improves the performance. However, because this coding depends on where the spectral nulls of the ISI channel are, the transmitter needs to know the ISI channel, which may be not possible in some applications. The precoding presented here is channel independent. On the other hand, the number of zeros inserted between informance symbols may impact the performance for different ISI channels. As mentioned above, the precoded OFDM systems can be generalized to general modulated coded OFDM systems with general G(z) as shown in FIG. 2.

Other embodiments of the invention will be apparent to those skilled in the art from consideration of the specification and practice of the invention disclosed herein. It is intended that the specification and examples be considered as exemplary only.

What is claimed is:

1. A method of preceding an orthogonal frequency division multiplexing (OFDM) system, comprising:

inserting one or more zeros between at least two sets of consecutive information symbols of the OFDM system by utilizing a precoder (G(z)), where $$G(z) = \begin{bmatrix} I_{K \times K} \\ 0_{(M-K) \times K} \end{bmatrix},$$

M and K are vector sizes, M>K, $I_{K \times K}$ is the K×K identity matrix, and $0_{(M-K) \times K}$ is the (M-K)×K all zeros matrix;

expanding a data rate of the OFDM system due to the insertion of zeros; and removing spectral nulls of an intersymbol interference (ISI) channel of the OFDM system due to expansion of the data rate of the OFDM system.

2. A method of precoding an OFDM system as recited in claim 1, wherein the OFDM system is precoded independent of the ISI channel.

3. A method of preceding an OFDM system as recited in claim 1, wherein the precoder (G(z)) inserts M-K zeros between at least two sets of K consecutive information symbols of the OFDM system.

4. A method of reducing a data rate overhead $\left(\frac{(N+L)}{N}\right)$ of an orthogonal frequency division multiplexing (OFDM) system, where N are the number of carriers in the OFDM system and L are intersymbol interference (ISI) channel lengths of the OFDM system, the method comprising:
- utilizing a precoder (G(z)), where $G(z)=I_{K \times K}$, K is a vector size, and $I_{K \times K}$ is the K×K identity matrix; and
- squaring the identity matrix ($I_{K \times K}$) of the precoder (G(z)) to group input data of the OFDM system into K×1 vectors, wherein the squaring of the identity matrix maintains the data rate of the OFDM system and reduces the data rate overhead $\left(\frac{(N+L)}{N}\right)$ of the OFDM system.

5. A method of reducing a data rate overhead of an OFDM system as recited in claim 4, wherein the squaring of the identity matrix $I_{K \times K}$) reduces the data rate overhead of the OFDM system K times.

6. A method of reducing a data rate overhead of an OFDM system as recited in claim 4, wherein the squaring of the identity matrix ($I_{K \times K}$) further removes spectral nulls from the ISI channel.

* * * * *

UNITED STATES PATENT AND TRADEMARK OFFICE
CERTIFICATE OF CORRECTION

PATENT NO. : 6,928,047 B1
DATED : August 9, 2005
INVENTOR(S) : Xiang-Gen XIA

It is certified that error appears in the above-identified patent and that said Letters Patent is hereby corrected as shown below:

Title page,
Item [57], ABSTRACT,
Line 11, "insert" should read -- inserted --.

Column 12,
Lines 43 and 64, after "A method of" delete "preceding" and insert -- precoding --.

Signed and Sealed this

Twenty-eighth Day of February, 2006

JON W. DUDAS
*Director of the United States Patent and Trademark Office*